(12) United States Patent
Fackler et al.

(10) Patent No.: US 7,530,921 B2
(45) Date of Patent: May 12, 2009

(54) APPARATUS AND METHOD PROVIDING NEUTRAL SAFEING FOR THE PROPULSION SYSTEM OF AN AGRICULTURAL WINDROWER

(75) Inventors: Robert L. Fackler, Ephrata, PA (US); Richard P. Strosser, Akron, PA (US)

(73) Assignee: CNH America LLC, New Holland, PA (US)

( * ) Notice: Subject to any disclaimer, the term of this patent is extended or adjusted under 35 U.S.C. 154(b) by 353 days.

(21) Appl. No.: 11/487,679

(22) Filed: Jul. 17, 2006

(65) Prior Publication Data

US 2007/0015628 A1  Jan. 18, 2007

Related U.S. Application Data

(60) Provisional application No. 60/699,641, filed on Jul. 15, 2005, provisional application No. 60/699,943, filed on Jul. 16, 2005.

(51) Int. Cl.
*B60W 10/00* (2006.01)
(52) U.S. Cl. ........................................................ 477/96
(58) Field of Classification Search .............. 192/219.4; 180/287, 272; 188/158
See application file for complete search history.

(56) References Cited

U.S. PATENT DOCUMENTS

| | | | | |
|---|---|---|---|---|
| 4,355,698 A | * | 10/1982 | Barnes et al. | 180/273 |
| 4,392,544 A | * | 7/1983 | Dilno | 180/273 |
| 4,398,618 A | * | 8/1983 | Hansen | 180/273 |
| 4,892,014 A | * | 1/1990 | Morell et al. | 477/92 |
| 6,202,016 B1 | | 3/2001 | Stephenson et al. | 701/51 |
| 6,293,363 B1 | * | 9/2001 | Rangaswamy et al. | 180/287 |
| 6,663,525 B1 | | 12/2003 | McKee et al. | 475/72 |
| 6,665,601 B1 | | 12/2003 | Nielsen | 701/50 |
| 6,699,155 B2 | | 3/2004 | Nagasaka | 477/94 |
| 6,758,298 B2 | * | 7/2004 | Eberling et al. | 180/272 |
| 6,901,729 B1 | | 6/2005 | Otto et al. | 56/208 |
| 2004/0251071 A1 | | 12/2004 | Yu et al. | 180/272 |
| 2004/0255706 A1 | | 12/2004 | Bulgrien | 74/335 |
| 2005/0065689 A1 | | 3/2005 | Budde | 701/50 |
| 2007/0015628 A1 | * | 1/2007 | Fackler et al. | 477/99 |
| 2007/0034745 A1 | * | 2/2007 | Fackler et al. | 244/158.2 |

* cited by examiner

*Primary Examiner*—Dirk Wright
(74) *Attorney, Agent, or Firm*—Patrick M. Sheldrake; John Wllliam Stader; Michael G. Harms

(57) ABSTRACT

Apparatus and a method providing neutral safeing for a propulsion system of an agricultural windrower having a FNR lever assembly including a FNR lever movable in relation to a neutral position in first and second directions, and a sensor for sensing positions of the FNR lever as the lever is moved and outputting signals representative thereof, the sensor being configured such that the signals outputted thereby are to have signal values within a predetermined range of values and/or which will change within a predetermined rate of change, a programmable control module in operative control of a park brake and programmed and operable for monitoring the signals and comparing the values of the signals to the predetermined range, and if the value of any of the signals is outside of the predetermined range, then automatically engaging the park brake.

39 Claims, 20 Drawing Sheets

```
1 /*
       MODULE:            PropSafe.005.c

DESCRIPTION:
5      OPEN ISSUES:

REVISION HISTORY:

10     rstross2002Jan130702  001  Module created
       jpeters2003Feb251624  002  timer reference method changed to incorporate time2scans type
       jpeters2003Apr010935  003  Removed relay drop time state (4)
       jpeters2003Aug151035  004  Added check of the NC side of the neutral switch
       jpeters2004Jun031035  005  Restructured to use machine mode
15 */ include "can1_out.h"
   #include "changes.h"
   #include "fault_log.h"
20 #include "fnr.h"
   #include "iomap_appl.h"
   #include "park_brake.h"
   #include "PropFault.h"
   #include "Propulsion.h"
25 #include "PropSafe.h"
   #include "stdlib.h"
   #include "sys_vars.h"
   #include "Steering_shaft.h"
30 #include "Timer.h"
   #include "warning.h"

#include "Trim_switches.h"

35 /*****************
       DEFINITIONS
   ****************/
40   // CONSTANT
         #define _DISABLE_DELAY_TIME    _time_b0_ui2scans_sec_f( 2.00 )
45   // ENUMERATIONS
         enum _propsafe_states( _state_NEUTRAL_CHECK,
                                _state_NEUTRAL,
                                _state_ENABLED,
                                _state_DISABLE_DELAY_TIME,
50                              _state_DESTOKE_DELAY_TIME
```

*Fig. 7*

```
        /******************
  55     MAPPING
        ******************/

// Map Inputs: Positive Logic...ON = non-zero...OFF = 0.
       #define  _mfh_S03_switch_in_neutral      iomap_digin_swstate_S03_fnr_neutral.debounced      // N/C switch, 1 = n
  60   #define  _cyl_neutral                    steering_shaft_neutral_status_xp()

//Map Outputs:
       #define  _prop_enable                    (iomap_HSDoutviaLSD_K35_fnr_neutral_relay=1)
       #define  _prop_disable                   (iomap_HSDoutviaLSD_K35_fnr_neutral_relay=0)
  65
       /******************
        VARIABLES
       ******************/

70   //Local Variables:
       static  enum   propsafe_states    _propsafe_state_b0_ui;
       static  enum   propsafe_states    _propsafe_cal_state_b0_ui;
       static  unsigned char             _propsafe_propcal_begin_b0_uc;
  75   static  bit                       _prop_enabled_bt;                   // enabled = TRUE, disabled = FALSE
       static  bit                       _prop_fault_enabled_bt;             // enabled = TRUE, disabled = FALSE
       static  bit                       _R18_S03_crosscheck_fault_bt;       // FALSE = OK, TRUE = problem
       static  unsigned char             _fault_F404_set_flag_b0_uc;
       static  unsigned char             _fault_F408_03_set_flag_b0_uc;
  80   static  unsigned char             _fault_F408_04_set_flag_b0_uc;

/******************
        FUNCTION PROTOTYPING
       ******************/
  85   static  void   propsafe_main( void );
       static  void   propsafe_calibrate_main( void );

/***************************************************************/
  90   void  prop_safe( const unsigned int machine_mode_b0_ui )
       {
          if( deluxe_model_b_xp )
          {
             switch( machine_mode_b0_ui )
  95         {
                case  INIT_main_STATE_MACHINE:
                case  CRITICAL_EE_VARS_OUT_OF_BOUNDS:
                case  WAKEUP_TEST_OUTPUTS:
                case  WAKEUP_LIGHTS_ONLY:
 100            case  NORMAL_ENGINE_OFF:
                case  NORMAL_ENGINE_STARTING:
                case  DIAG_N_SETUP_ENGINE_OFF:
```

*Fig. 8*

```
105         case POWER_DOWN:
            case XCM_SETUP:
                break;        // do nothing 110         case WAKEUP_APPLICATION_INIT:
                propsafe_init();
                break;

115         case NORMAL_ENGINE_RUNNING:
                propsafe_main();
                break;

case CALIBRATION_ENGINE_STARTING:
            case CALIBRATION_ENGINE_RUNNING:
                propsafe_calibrate_main();
120             break;
            }
    }

125 /*******************************************************************/
    void propsafe_init( void )
    {
        _prop_disable;
        _propsafe_state_b0_ui  = _state_NEUTRAL_CHECK;
130     _propsafe_cal_state_b0_ui = _state_NEUTRAL;
        _propsafe_propcal_begin_b0_uc = 0;

propfault_init();    //cfoster11nov2004
135 }

/*******************************************************************/
    static void propsafe_main( void )
140 {
    /*
     * Description: Main state control for Propulsion Safing Sub-System.
     */
145     static unsigned int  _timer_b0_ui;
        static unsigned int  _2_second_counter_b0_ui, _10_second_counter_b0_ui, _45_second_counter_b0_ui, _90_seco
        signed int           _commanded_disp_in_b12_si;
        static bit           _test_for_sticking_bt;
        bit                  _mfh_is_in_fwd_bt;
150
        #define _SOFT    0
        #define _MEDIUM  1
        #define _HARD    2
```

Fig. 9

```
155     _prop_disable;
        _prop_enabled_bt = FALSE;                                          // default to disabled 160     if( _park_brake_status_on_bt_xp )
            _propsafe_state_b0_ui = _state_NEUTRAL_CHECK;                  // stay at initial state //_CAN_test_data[0].byte.lo = _propsafe_state_b0_ui;
        //_CAN_test_data[0].byte.hi = _prop_enabled;
165     //_CAN_test_data[1].byte.lo = _fnr_neutral;
        //_CAN_test_data[1].byte.hi = _cyl_neutral;
        //_CAN_test_data[2].word    = Steering_shaft_neutral_b0_uc;
        //_CAN_test_data[3].byte.lo = _fnr_out_of_neutral_warning_b0_uc;
        //_CAN_test_data[3].byte.hi = _warning_msg_b0_uc;

170     switch( _propsafe_state_b0_ui )
        {
        case _state_NEUTRAL_CHECK:
175         propfault_init();                                              //cfoster1nov2004 if( _cyl_neutral && mfh_is_back_to_neutral_status_xp() )
                _propsafe_state_b0_ui = _state_NEUTRAL;
180         break;

case _state_NEUTRAL:
185         propfault_init();                                              //cfoster1nov2004

_fault_F404_set_flag_b0_uc = 0;
            _fault_F408_03_set_flag_b0_uc = 0;
            _fault_F408_04_set_flag_b0_uc = 0;

190         if( mfh_is_out_of_neutral_status_xp() )                        // if he moves MFH out of neutral
            {
                if(   steering_shaft_initialization_problem_b_xp()         // if either one of these is true then we're
                   || propulsion_ee_validation_status_b0_uc()              // definitely not running propulsion fuction
                )
195             {
                    warning_add( _W049, _time2scans_b0 0 _sec_f );         // Propulsion fault warning
                    _propsafe_state_b0_ui = _state_NEUTRAL_CHECK;          // he'll have to key off to get rid of the m
                }
                else
                {
200                 _2_second_counter_b0_ui = _10_second_counter_b0_ui = _45_second_counter_b0_ui = _90_second_cou
                    _test_for_sticking_bt = TRUE;
                    _propsafe_state_b0_ui = _state_ENABLED;                // go to next state
```

Fig. 10

```
205         )
            break;

210     case _state_ENABLED:
            _prop_enable;
            _prop_enabled_bt = TRUE;

215         propfault_main();                           //cfoster1nov2004    propfault_main must be
        //  NOTE
        //  doing this will preclude an active destroke because the propulsion power (HSD19 - K35_fnr_neutral_relay)
        //  will be off and the propsafe_get_prop_enabled_logic_uc() function will return a 0 (disabled)....
        //  and that is probably as expected - just wanted to add this note
220         if( !propfault_state_b0_uc )
            (
                _propsafe_state_b0_ui = _state_NEUTRAL_CHECK;       // go back to initial state
                break;
            )
225     // Look for pull back to neutral --> CROSS CHECK R18 with S03
            _R18_S03_crosscheck_fault_bt = FALSE;                   // clr this first before each scan thr
230     #define __F408_03_DELAY 10 if
            (
235             mfh_is_out_of_neutral_status_xp()                   // if MFH is still out of neutral
                && __mfh_S03_switch_in_neutral                      // this had better be low
            )
            (
240             if( _fault_F408_03_set_flag_b0_uc == __F408_03_DELAY )   //Delay "n" scans before declaring fau
                (
                    fault_log_add_fault( __F408_03 );               // out of pot neutral and switch input
                    ++_fault_F408_03_set_flag_b0_uc;
                    _R18_S03_crosscheck_fault_bt = TRUE;            // PROBLEM
                )
245             else if( _fault_F408_03_set_flag_b0_uc < __F408_03_DELAY )   // data acq Jan 20 2005 showed max of
                    ++_fault_F408_03_set_flag_b0_uc;
            )
            else
250             _fault_F408_03_set_flag_b0_uc = 0;
        #undef __F408_03_DELAY while(1)
        (
255         #define __F404_DELAY 10
```

Fig. 11

```
       if
       (
              __mfh_S03_switch_in_neutral                                // will go high if have +12VD pwr and
              && mfh_is_out_of_neutral_status_xp()                       // MFH pot R18 should not be beyond th
       )
260    {
              if( _fault_F404_set_flag_b0_uc == __F404_DELAY )           //Delay "n" scans before declaring fau
              {                                                          // out of pot neutral and switch input
                     fault_log_add_fault( _F404_14 );                    // PROBLEM
                     ++_fault_F404_set_flag_b0_uc;                       // data acq Jan 20 2005 showed max of
265                  _R18_S03_crosscheck_fault_bt = TRUE;
              }
              else if( _fault_F404_set_flag_b0_uc < __F404_DELAY )
                     ++_fault_F404_set_flag_b0_uc;
              break;
270    }
       else
              _fault_F404_set_flag_b0_uc = 0;
       #undef __F404_DELAY 275    #define __F408_04_DELAY 10 if
       (
              __mfh_S03_switch_in_neutral                                // if MFH pot R18 is this far back, SO
280           && !__mfh_is_back_to_neutral_status_xp()                   // and will go high if have +12VD pwr
       )
       {
              if( _fault_F408_04_set_flag_b0_uc == __F408_04_DELAY )     // in pot neutral with 12VD powered an
              {                                                          // PROBLEM
285                  fault_log_add_fault( _F408_07 );                    // data acq Jan 20 2005 showed max of
                     ++_fault_F408_04_set_flag_b0_uc;
                     _R18_S03_crosscheck_fault_bt = TRUE;
              }
              else if( _fault_F408_04_set_flag_b0_uc < __F408_04_DELAY )
290                  ++_fault_F408_04_set_flag_b0_uc;
              break;
       }
       else
              _fault_F408_04_set_flag_b0_uc = 0;
295    #undef __F408_04_DELAY if
       (
              __mfh_S03_switch_in_neutral                                // will go high if have +12VD pwr and
300           && mfh_is_back_to_neutral_status_xp()                      // R18 agrees... this is the good and
       )
       {
              _timer_b0_ui=_DISABLE_DELAY_TIME;                          // yes, both indicators say we've pull
              _propsafe_state_b0_ui = _state_DISABLE_DELAY_TIME;         // go to next state
305    }
```

*Fig. 12*

```
        break;
    }

310 // look for other errors with critical propulsion components

// MFH
315 if( _R18_S03_crosscheck_fault_bt                                          // if set from the above tests
        || mfh_R18_v_b11_ui_w_errors_returned() >= 0xfb00 )                   // OR MFH potentiometer reading has an error
    {
        propulsion_ESTOP_state_machine_start();
        _timer_b0_ui=_DISABLE_DELAY_TIME;                                     // do an active destroke
        _propsafe_state_b0_ui = _state_DESTOKE_DELAY_TIME;                    // go to next state
    }

320 // PROP CYL POT
    if( steeringshaft_in_off2_b12_ui_w_error_returned() > 0xfaff ) // test prop cylinder potentiometer readi
    {
325     propsafe_disable_propulsion();                                        // disable Propulsion System...Cut power to
        _propsafe_state_b0_ui = _state_NEUTRAL_CHECK;                         // go back to initial state
    }

330 _commanded_disp_in_b12_si = _fnr_v_b11_si_to_distance_d_b12_si( mfh_R18_v_b11_ui_w_errors_returned() );

/*******************************/
    #ifdef  engr_data_acq_stuck_prop
335 CAN_test_data2[1].word = valid_steeringshaft_in_b12_si();
    CAN_test_data2[2].word = valid_steeringshaft_in_b12_si() >> 2;
    #endif
    /*******************************/

340 if( mfh_R18_v_b11_ui_w_errors_returned() < ee_mfh_fwd_swpoint_going_out_v_b11_ui )   // if MFH p
        _mfh_is_in_fwd_bt = TRUE;
    else
    {
345     _mfh_is_in_fwd_bt = FALSE;
        _commanded_disp_in_b12_si = -_commanded_disp_in_b12_si;
    }

/*******************************/
    #ifdef  engr_data_acq_stuck_prop
350 CAN_test_data2[1].word = -valid_steeringshaft_in_b12_si();
    CAN_test_data2[2].word = (-valid_steeringshaft_in_b12_si() ) >> 2;
    #endif
    /*******************************/
355
```

365     /*****************************************/
        #ifdef   engr_data_acq_stuck_prop
        CAN_test_data2[0].word = __commanded_disp_in_b12_si;

CAN_test_data  [1].word = __2_second_counter_b0_ui;
        CAN_test_data  [2].word = __10_second_counter_b0_ui;
370     CAN_test_data  [3].word = __45_second_counter_b0_ui;
        CAN_test_data2[3].word = __90_second_counter_b0_ui;
        #endif
375     /*****************************************/ if(   mfh_is_out_of_neutral_status_xp()           // if he's still out of neutral... I want to prevent where he
           && __test_for_sticking_bt                      // then returned back towards neutral just a little but not en
          )
380     {
          if( __commanded_disp_in_b12_si > disp_in_b12_si( 0.325 ) )    // allow 2 seconds
          (
            ++__10_second_counter_b0_ui;
385         ++__45_second_counter_b0_ui;
            ++__90_second_counter_b0_ui;

if( abs(valid_steeringshaft_in_b12_si()) < disp_in_b12_ui( 0.100 ) ) // signed values---fwd is asc
              ++__2_second_counter_b0_ui;
390         else
              __test_for_sticking_bt = FALSE;

switch( ee_propulsion_drive_mode_nbl )
395       {
            case __SOFT:
              if( __2_second_counter_b0_ui > _time_b0_ui2scans_sec_f( 8.000 ) )          // this tel
                set_prop_cyl_stuck_bt();
400           break;

case __MEDIUM:
              if( __2_second_counter_b0_ui > _time_b0_ui2scans_sec_f( 4.000 ) )          // this tel
405             set_prop_cyl_stuck_bt();
              break;
```

*Fig. 14*

```
         case __HARD:
410          if( __2_second_counter_b0_ui > _time_b0_ui2scans_sec_f( 2.000 ) )           // this tel
                 set_prop_cyl_stuck_bt();
415          break;
         }
         else if( __commanded_disp_in_b12_si > disp_in_b12_si( 0.250 ) )           // allow 10 seconds
         {
420          ++__45_second_counter_b0_ui;
             ++__90_second_counter_b0_ui;
             if( abs(valid_steeringshaft_in_b12_si()) < disp_in_b12_ui( 0.100 ) )  // signed values---fwd is asc
                 ++__10_second_counter_b0_ui;
             else
425              __test_for_sticking_bt = FALSE;
             switch( ee_propulsion_drive_mode_nbl )
             {
             case __SOFT:
430              if( __10_second_counter_b0_ui > _time_b0_ui2scans_sec_f( 10.000 ) )      // this tel
                     set_prop_cyl_stuck_bt();
435              break;
             case __MEDIUM:
                 if( __10_second_counter_b0_ui > _time_b0_ui2scans_sec_f( 10.000 ) )      // this tel
440                  set_prop_cyl_stuck_bt();
                 break;
             case __HARD:
                 if( __10_second_counter_b0_ui > _time_b0_ui2scans_sec_f( 10.000 ) )      // this tel
445                  set_prop_cyl_stuck_bt();
                 break;
             }
450      else if( __commanded_disp_in_b12_si > disp_in_b12_si( .188 ) )            // allow 45 seconds
         {
             ++__90_second_counter_b0_ui;
             if( abs(valid_steeringshaft_in_b12_si()) < disp_in_b12_ui( 0.100 ) )  // signed values---fwd is asc
                 ++__45_second_counter_b0_ui;
             else
455              __test_for_sticking_bt = FALSE;
```

*Fig. 15*

```
      switch( ee_propulsion_drive_mode_nbl )
460   {
      case __SOFT:

465       if( __45_second_counter_b0_ui > __time_b0_ui2scans_sec_f( 10.000 ) )      // this tel
              set_prop_cyl_stuck_bt();

470       break;
      case __MEDIUM:

if( __45_second_counter_b0_ui > __time_b0_ui2scans_sec_f( 10.000 ) )      // this tel
              set_prop_cyl_stuck_bt();

475       break;
      case __HARD:

480       if( __45_second_counter_b0_ui > __time_b0_ui2scans_sec_f( 10.000 ) )      // this tel
              set_prop_cyl_stuck_bt();

break;
      }
485   else if( __commanded_disp_in_b12_si > disp_in_b12_si( .125 ) )      // allow 90 seconds
      {
          if( abs(valid_steeringshaft_in_b12_si()) < disp_in_b12_ui( 0.100 ) ) // signed values--fwd is asc
              ++__90_second_counter_b0_ui;
          else
              __test_for_sticking_bt = FALSE;

490       switch( ee_propulsion_drive_mode_nbl )
          {
          case __SOFT:

495           if( __90_second_counter_b0_ui > __time_b0_ui2scans_sec_f( 10.000 ) )      // this tel
                  set_prop_cyl_stuck_bt();

break;
500       case __MEDIUM:

if( __90_second_counter_b0_ui > __time_b0_ui2scans_sec_f( 10.000 ) )      // this tel
                  set_prop_cyl_stuck_bt();

505           break;
          case __HARD:

510           if( __90_second_counter_b0_ui > __time_b0_ui2scans_sec_f( 10.000 ) )      // this tel
                  set_prop_cyl_stuck_bt();
```

Fig. 16

```
460    switch( ee_propulsion_drive_mode_nbl )
       {
           case __SOFT:
465            if( __45_second_counter_b0_ui > _time_b0_ui2scans_sec_f( 10.000 ) )    // this tel
                   set_prop_cyl_stuck_bt();
               break;
470        case __MEDIUM:
               if( __45_second_counter_b0_ui > _time_b0_ui2scans_sec_f( 10.000 ) )    // this tel
                   set_prop_cyl_stuck_bt();
475            break;
           case __HARD:
               if( __45_second_counter_b0_ui > _time_b0_ui2scans_sec_f( 10.000 ) )    // this tel
                   set_prop_cyl_stuck_bt();
480            break;
       }
       else if( __commanded_disp_in_b12_si > disp_in_b12_si( .125 ) )    // allow 90 seconds
       {
485        if( abs(valid_steeringshaft_in_b12_si()) < disp_in_b12_ui( 0.100 ) )  // signed values---fwd is asc
               ++__90_second_counter_b0_ui;
           else
               __test_for_sticking_bt = FALSE;
490        switch( ee_propulsion_drive_mode_nbl )
           {
               case __SOFT:
495                if( __90_second_counter_b0_ui > _time_b0_ui2scans_sec_f( 10.000 ) )   // this tel
                       set_prop_cyl_stuck_bt();
                   break;
500            case __MEDIUM:
                   if( __90_second_counter_b0_ui > _time_b0_ui2scans_sec_f( 10.000 ) )   // this tel
                       set_prop_cyl_stuck_bt();
505                break;
               case __HARD:
                   if( __90_second_counter_b0_ui > _time_b0_ui2scans_sec_f( 10.000 ) )   // this tel
510                    set_prop_cyl_stuck_bt();
```

*Fig. 17*

```
            break;
        }
515     if( _commanded_disp_in_b12_si <= disp_in_b12_si( .125 ) )      //
            _test_for_sticking_bt = TRUE;

520     if( !_test_for_sticking_bt )
            _2_second_counter_b0_ui = _10_second_counter_b0_ui = _45_second_counter_b0_ui = _90_second_counte
        break;
525     case _state_DISABLE_DELAY_TIME:
            _prop_enable;
            _prop_enabled_bt = TRUE;
530     propfault_main();                                                // cfoster11nov2004 propfault_main MUST BE C
        if( !propfault_state_b0_uc )
            _propsafe_state_b0_ui = _state_NEUTRAL_CHECK;                // go back to initial state
        else
        {
535     if( mfh_is_out_of_neutral_status_xp()                            // if he moves MFH out of neutral (beyond th
            && !_mfh_S03_switch_in_neutral                               // will go high if have +12VD pwr and mfh co
        )
        {
            _test_for_sticking_bt = TRUE;
540         _2_second_counter_b0_ui = _10_second_counter_b0_ui = _45_second_counter_b0_ui = _90_second_cou
            _propsafe_state_b0_ui = _state_ENABLED;                      // go back and continue providing propulsiom
        }
545     if( !(--_timer_b0_ui) )                                          // if we timed out
            _propsafe_state_b0_ui = _state_NEUTRAL;                      // go back to the beginning, dropping propul
        }
        break;
550     case _state_DESTOKE_DELAY_TIME:
            _prop_enable;
            _prop_enabled_bt = TRUE;
555     propfault_main();                                                // cfoster11nov2004 propfault_main MUST BE C
        if( !(--_timer_b0_ui) )                                          // if we timed out
            _propsafe_state_b0_ui = _state_NEUTRAL_CHECK;                // go back to the beginning, dropping propul
560     break;
```

Fig. 18

```
565     }
        /****************************************************************/
570     static void propsafe_calibrate_main( void )
        {
        /*
         * Description: Main state control for Propulsion Safing Sub-System.
         */
         static unsigned int __timer_b0_ui;

575      _prop_disable;
         _prop_enabled_bt = FALSE;                              // default to disabled 580      if( park_brake_status_on_bt_xp )
             _propsafe_state_b0_ui = _state_NEUTRAL_CHECK;      // stay at initial state //CAN_test_data[0].byte.lo = _propsafe_state_b0_ui;
         //CAN_test_data[0].byte.hi = _prop_enabled;
585      //CAN_test_data[1].byte.lo = _fnr_neutral;
         //CAN_test_data[1].byte.hi = _cyl_neutral;
         //CAN_test_data[2].word    = Steering_shaft_neutral_b0_uc;
         //CAN_test_data[3].byte.lo = _fnr_out_of_neutral_warning_b0_uc;
         //CAN_test_data[3].byte.hi = _warning_msg_b0_uc;

590      switch( _propsafe_cal_state_b0_ui )
         {
            case _state_NEUTRAL_CHECK:

595             if( _propsafe_propcal_begin_b0_uc )
                {
                    _propsafe_propcal_begin_b0_uc = 0;
                    _propsafe_cal_state_b0_ui = _state_NEUTRAL;
                }

600         case _state_NEUTRAL:

if( mfh_is_out_of_neutral_status_xp() )         // if he moves MFH out of neutral
605                 _propsafe_cal_state_b0_ui = _state_ENABLED; // go to next state break;

case _state_ENABLED:

610             _prop_enable;
                _prop_enabled_bt = TRUE;
```

Fig. 19

```
615         if( mfh_is_back_to_neutral_status_xp() )            // if MFH pot R18 says S03 should surely be
            {
                _timer_b0_ui= DISABLE_DELAY_TIME;
                _propsafe_cal_state_b0_ui = _state_DISABLE_DELAY_TIME;  // go to next state
            }
620         break;

case _state_DISABLE_DELAY_TIME:
625         _prop_enable;
            _prop_enabled_bt = TRUE;

if( mfh_is_out_of_neutral_status_xp() )             // if he moves MFH out of neutral (beyond th
                _propsafe_cal_state_b0_ui = _state_ENABLED;     // go back and continue providing propulsiom 630         if( !(-- _timer_b0_ui) )                            // if we timed out
                _propsafe_cal_state_b0_ui = _state_NEUTRAL;     // go back to the beginning, dropping propul 635     }
            break;

/*************************************************************************************/
640     bit  propsafe_get_prop_enabled_logic_b_xp( void )
    {
        return( _prop_enabled_bt );                             // FALSE = disabled; TRUE = enabled;
    }

/*************************************************************************************/
645     void propsafe_disable_propulsion( void )
    {
        propulsion_ESTOP_state_machine_start();
650     propsafe_init();
    }

/*************************************************************************************/
    void propsafe_propcal_begin( void )
655 {
        _propsafe_propcal_begin_b0_uc = 1;
    }
```

*Fig. 20*

… # APPARATUS AND METHOD PROVIDING NEUTRAL SAFEING FOR THE PROPULSION SYSTEM OF AN AGRICULTURAL WINDROWER

This application claims the benefit of U.S. Provisional Application No. 60/699,641, filed Jul. 15, 2005, and U.S. Provisional Application No. 60/699,943, filed Jul. 16, 2005.

TECHNICAL FIELD

The present invention relates to vehicular safeing and, more particularly, to apparatus and a method providing neutral safeing for a propulsion system of an agricultural windrower.

BACKGROUND OF THE INVENTION

U.S. Provisional Application No. 60/699,641, filed Jul. 15, 2005, and U.S. Provisional Application No. 60/699,943, are incorporated herein in their entirety by reference. U.S. Pat. No. 6,901,729 is also incorporated herein in its entirety by reference.

Vehicles, such as, but not limited to, agricultural windrowers, can utilize control algorithms for translating input signals, for instance, from operator controlled input devices such as a forward-neutral-reverse (FNR) lever, also sometimes referred to as a multi-function-handle (MFH), to systems to be controlled thereby, such as the propulsion driveline.

It is therefore desirable to have a capability to monitor the performance of such control algorithms, to ensure that the input commands are being accurately and safely translated into machine operations and movements. This can be generally referred to as propulsion system safeing. It is also desirable to have the capability to determine or sense when a controlled system, such as a propulsion driveline, is no longer tracking a reference input signal sufficiently well. A degradation in the tracking capability can occur for any of several reasons, such as an interrupted or corrupted communication path, such as due to electrical noise and/or damage to a conductive path such as a wiring harness, physical wear or damage, and the like. It is also desirable to have the ability to determine or sense when the controlled system is overshooting or undershooting a system bounds. For instance, a propulsion system may drive a vehicle such as a windrower at a speed greater than a set speed. A system can overshoot (measured system output exceeds the desired output value) or undershoot (measured system output is less than the desired output value), which may indicate that a controller for the output has become unstable. Safeing in the instance of these conditions, will provide a manner of returning to a safe mode, which can include automatically going to a neutral mode, and/or shutting down the propulsion system.

It is also to have the capability for providing neutral safeing, that is, the ability to ensure that when the FNR lever is moved to the neutral position, or is already in the neutral position, the windrower is prevented from moving either in the forward, or the reverse direction.

SUMMARY OF THE DISCLOSURE

Accordingly, what is disclosed is apparatus and a method for providing neutral safeing of a propulsion system of an agricultural windrower.

According to the invention, a FNR lever assembly includes a FNR lever having a neutral position and is movable in relation to the neutral position in a first direction and in a second direction opposite the first direction. At least one sensor is disposed and operable for sensing positions of the FNR lever as the lever is moved in the first and second directions and outputting signals representative thereof, and is configured such that the signals outputted thereby are to have signal values within a predetermined range of values. A combination of a hard-wired logic circuit and a programmable control module are connected with at least one sensor for receiving the signals therefrom, and are connected in operative control to control electrical power to the propulsion driveline According to another aspect of the invention, the propulsion driveline returns to a zero-machine state when electrical power is removed from the propulsion driveline.

According to another aspect of the invention, the electrical power to the propulsion driveline is removed if the park brake is engaged.

According to another aspect of the invention, the control module output is interlocked with the hard-wire logic circuit and the interlock must be enabled to provide electrical power to the propulsion driveline.

According to still another aspect of the invention, a latch circuit is provided and energizable for providing power to the propulsion driveline, the control module being connected in operative control of the latch circuit, and the control module being operable for engaging the electrical power to the propulsion driveline.

As another advantage, the FNR lever must be moved out of the neutral position to latch a latching circuit for sending power to the propulsion controls.

According to still another aspect of the invention, the control module is programmed such that when the FNR lever transitions from Neutral-to-Forward or from Neutral-to-Reverse, electrical power is sourced from the control module from the associated neutral safeing hard-wire logic circuit.

In another aspect of the invention, the control module is programmed such that when the FNR lever transitions from Forward-to-Neutral or from Reverse-to-Neutral, electrical power is removed via the control module from the associated neutral safeing hard-wire logic circuit after a predetermined delay time.

According to still another aspect of the invention, electrical power is immediately removed via the control module in response to specific critical faults associated with loss of module control of the propulsion driveline.

According to still another aspect of the invention, electrical power is removed via the control module in response to specific critical faults associated with loss of operator control of the propulsion driveline, following control module return of the propulsion driveline to the neutral state.

BRIEF DESCRIPTION OF THE DRAWINGS

The advantages of this invention will be apparent upon consideration of the following detailed disclosure of the invention, especially when taken in conjunction with the accompanying drawings wherein:

FIG. 7 is a listing of code of a computer program incorporating steps of a preferred embodiment of the method of the invention;

FIG. 8 is a continuation of the listing;

FIG. 9 is a continuation of the listing;

FIG. 10 is a continuation of the listing;

FIG. 11 is a continuation of the listing;

FIG. 12 is a continuation of the listing;

FIG. 13 is a continuation of the listing;

FIG. 14 is a continuation of the listing;

FIG. 15 is a continuation of the listing;

FIG. 16 is a continuation of the listing;

FIG. 17 is a continuation of the listing;

FIG. 18 is a continuation of the listing;

FIG. 19 is a continuation of the listing; and

FIG. 20 is a continuation of the listing;

DETAILED DESCRIPTION OF THE PREFERRED EMBODIMENTS

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail. Still further, in this description, the terms FNR lever, multi-function handle and MFH referred to the same item, and therefore are interchangeable.

Figure 1:
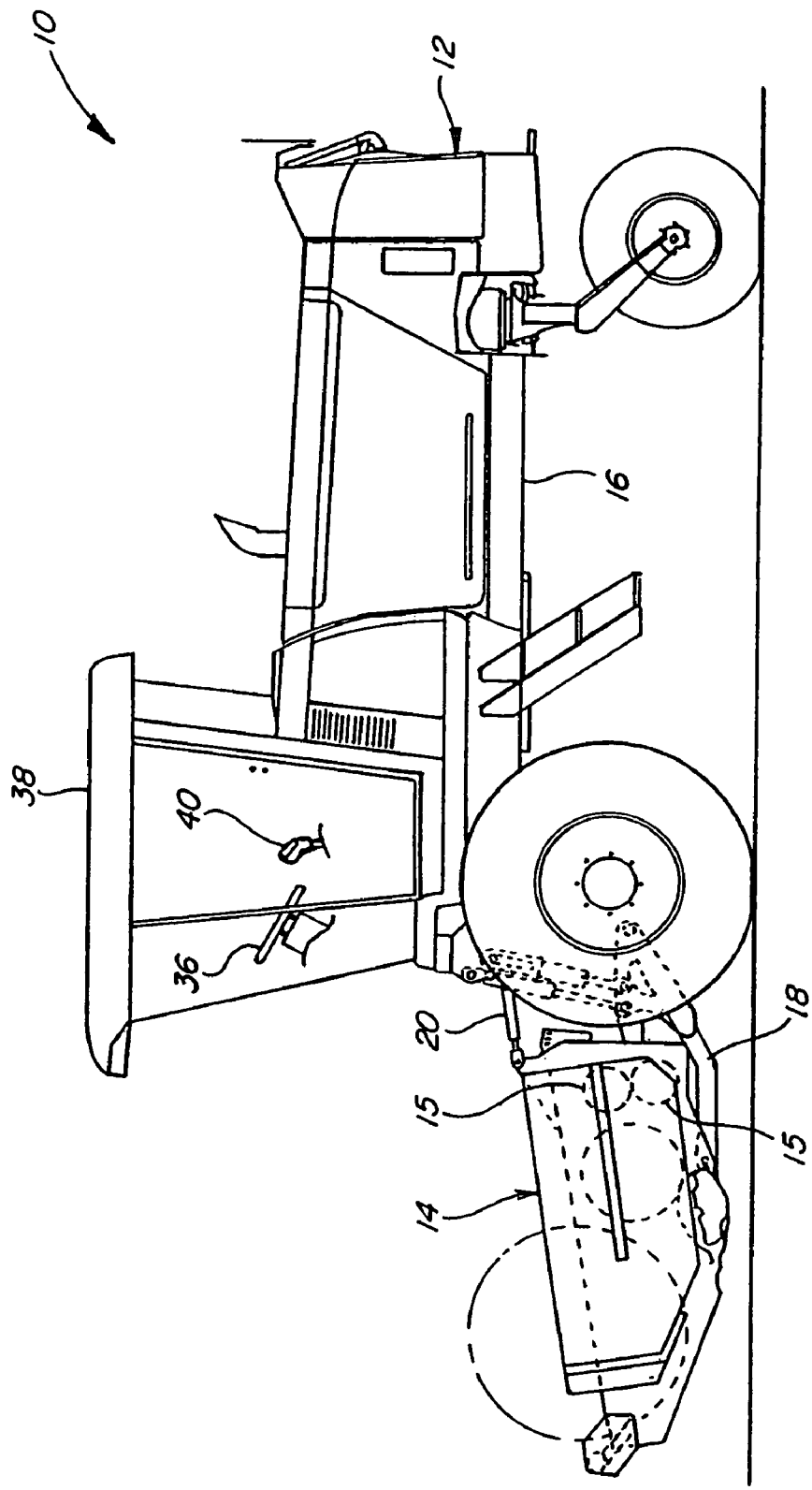
FIG. 1 is a side elevational view of a windrower of the type with which the invention may be used, including a header for severing crops from a field, mounted on a front end of the windrower.
Figure 2:
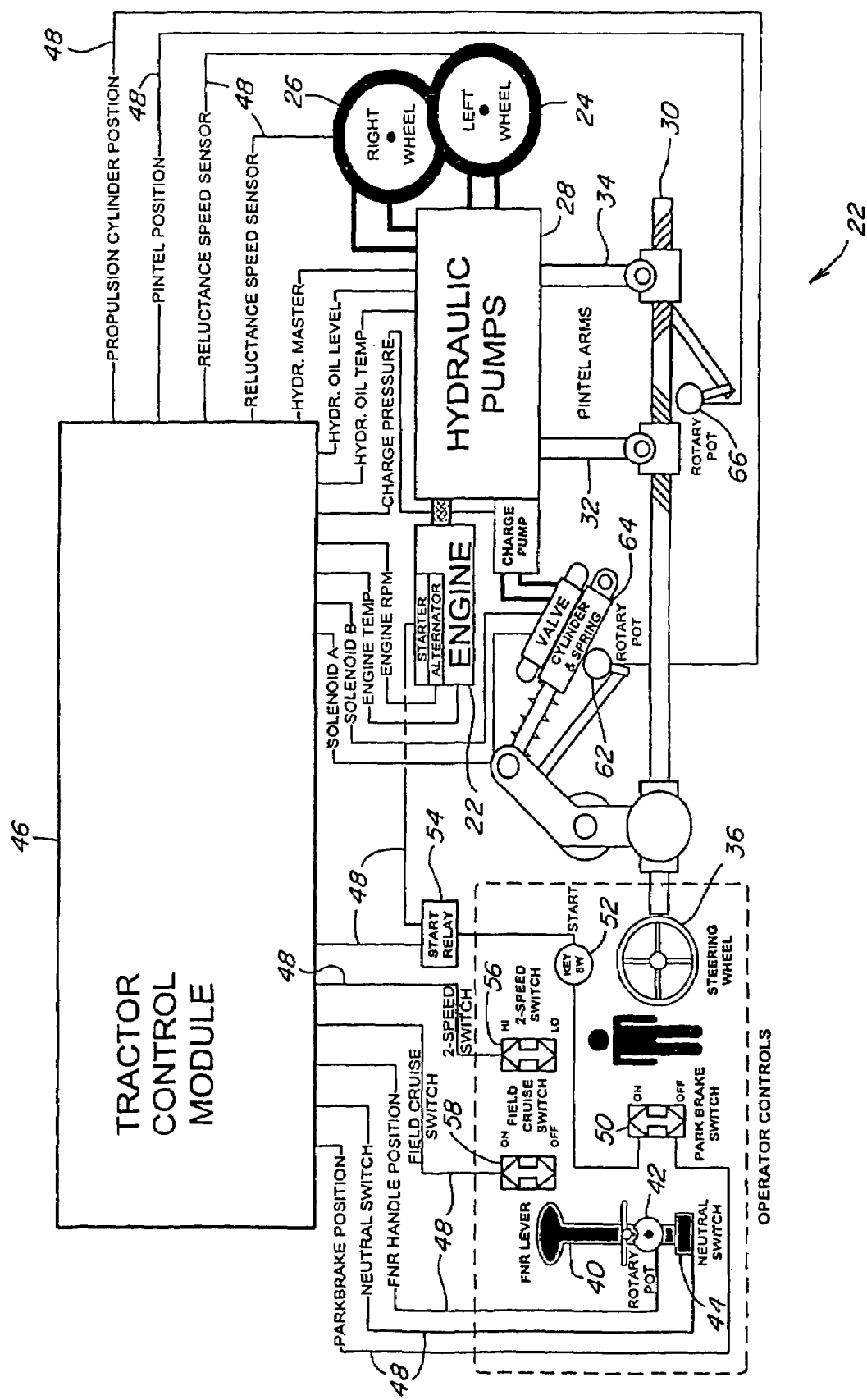
FIG. 2 is a simplified diagrammatic representation of a propulsion driveline of the windrower incorporating aspects of the instant invention.
Figure 3:
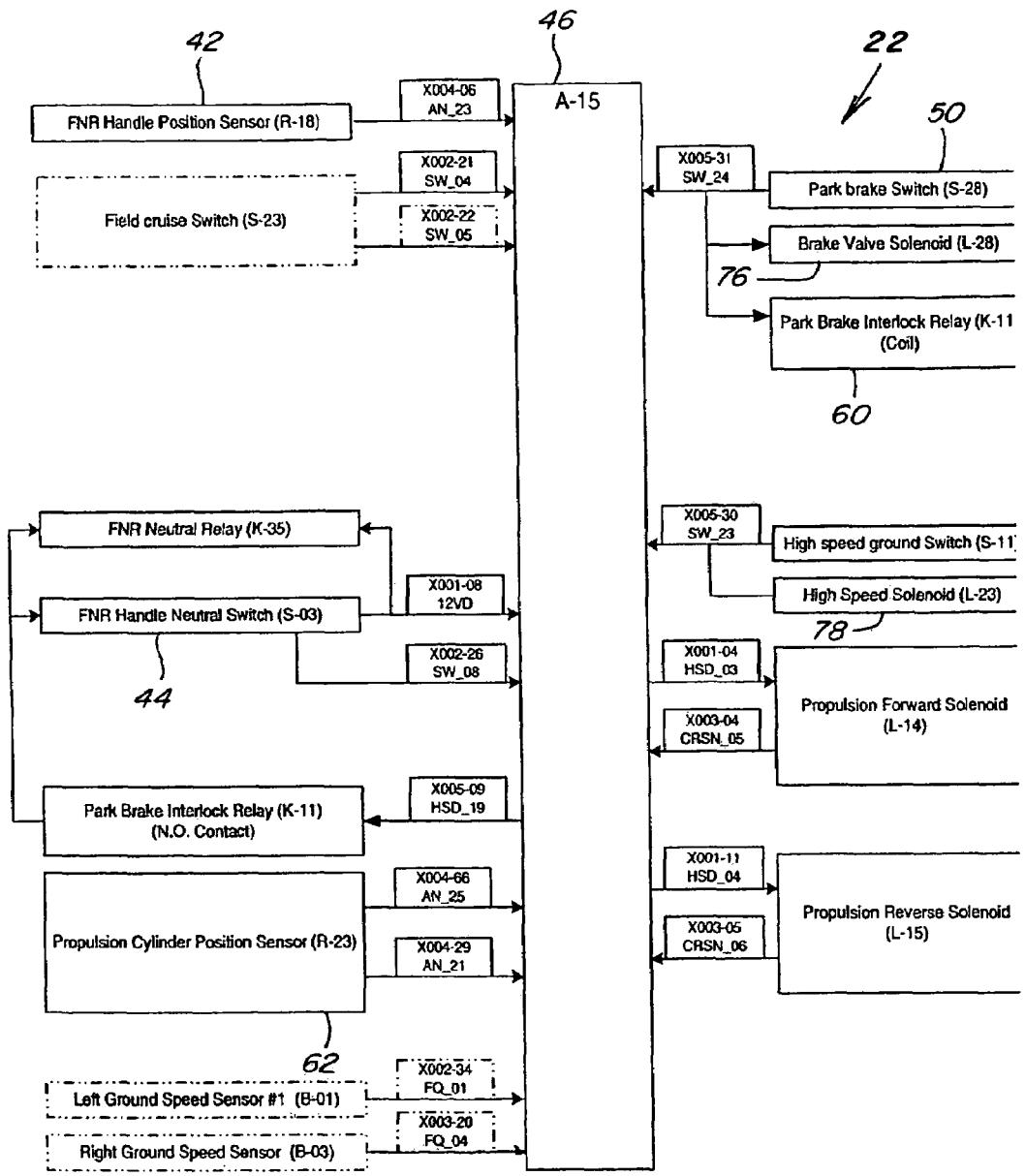
FIG. 3 is a schematic of circuitry of the propulsion driveline.
Figure 4:
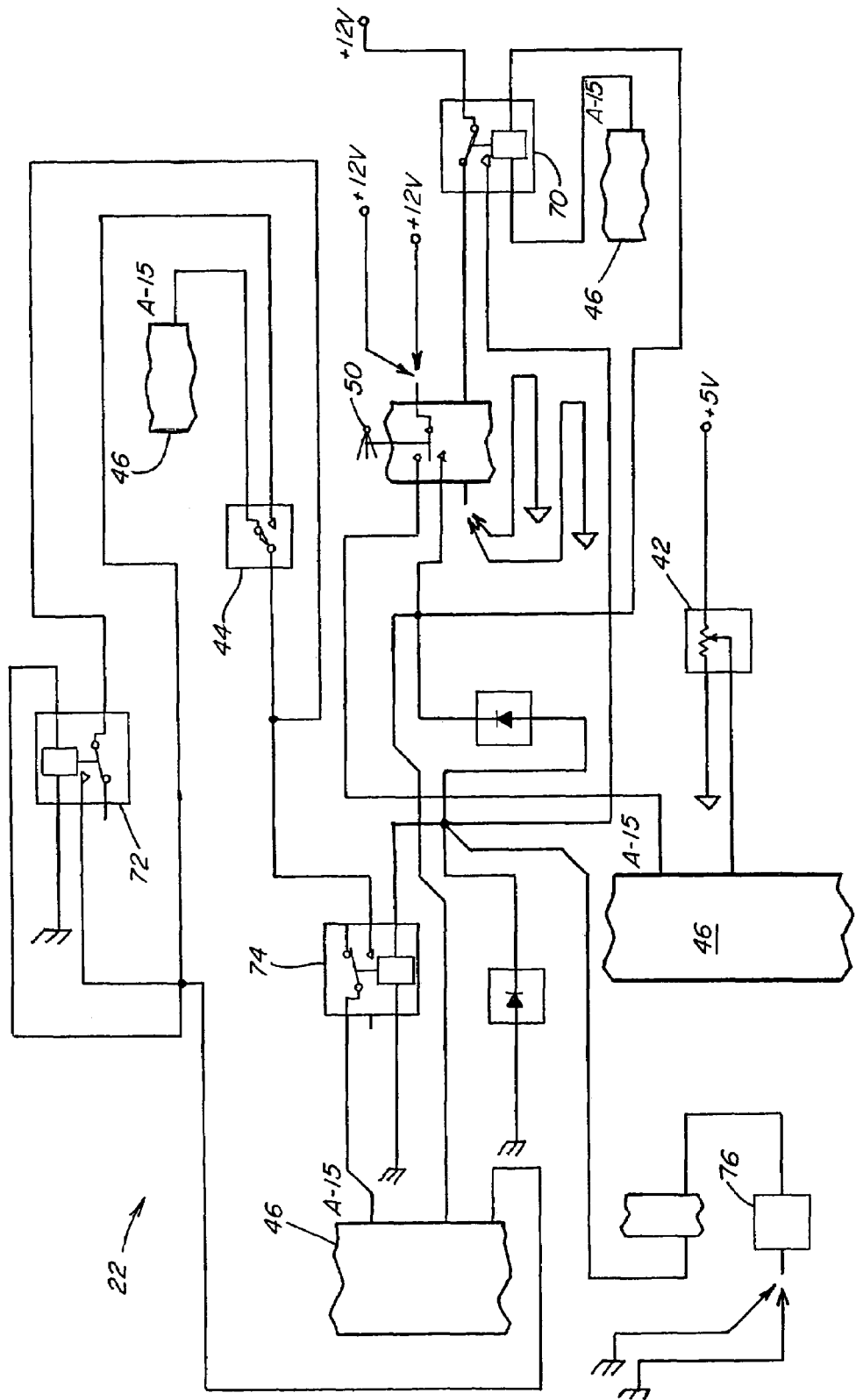
FIG. 4 is a schematic of other aspects of circuitry of the propulsion driveline.
Figure 5:
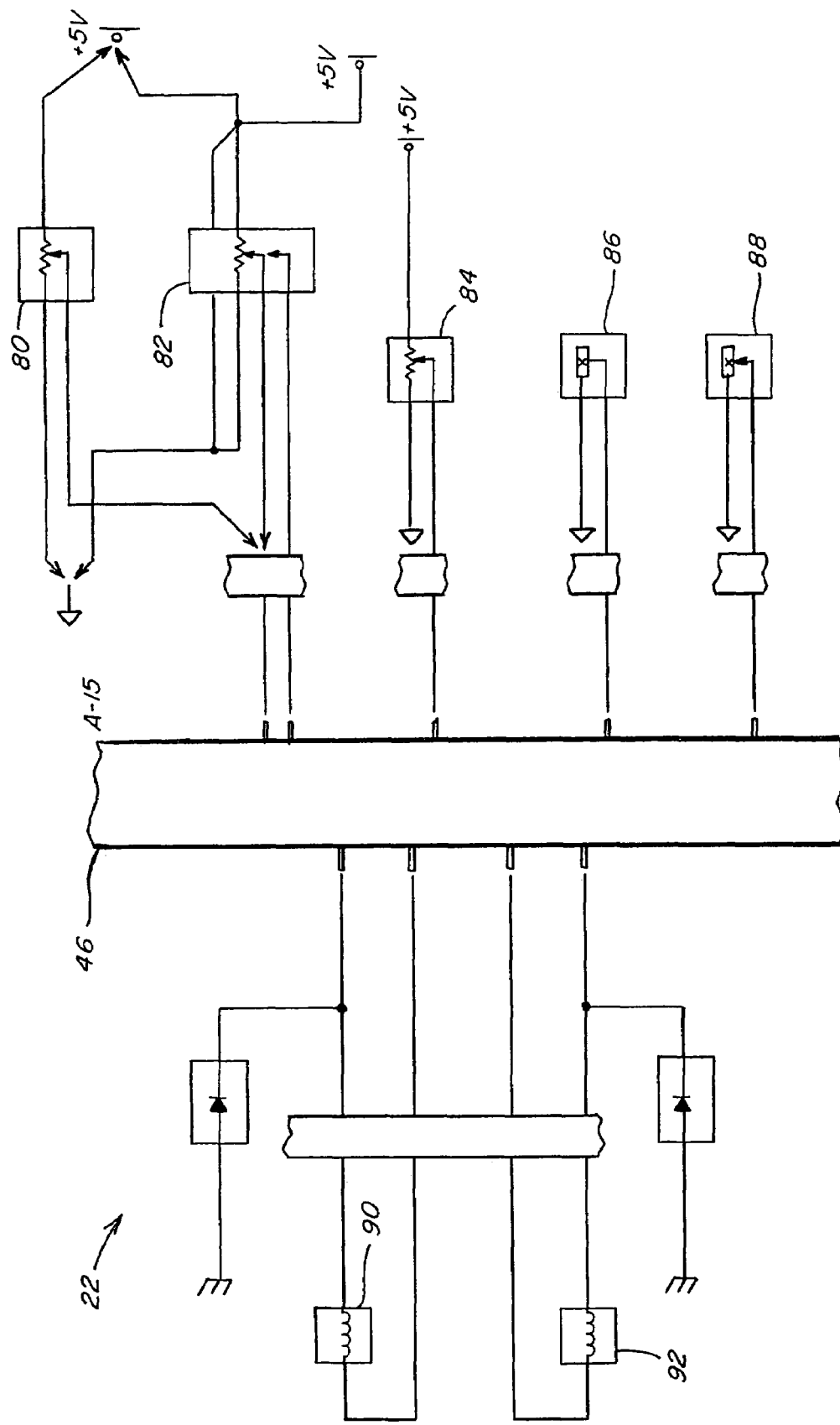
FIG. 5 is another schematic of circuitry of the propulsion driveline.
Figure 6:
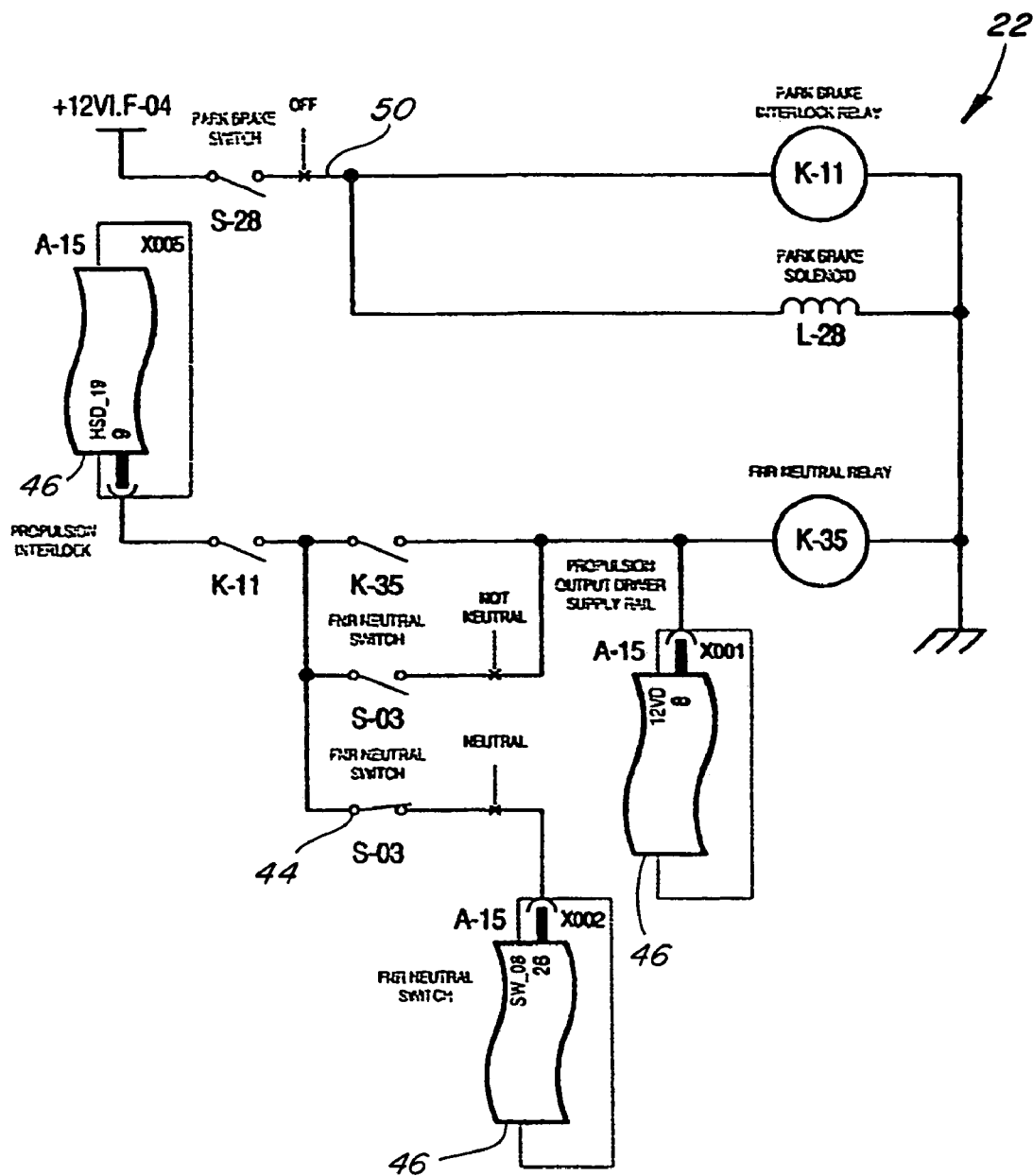
FIG. 6 is another schematic of circuitry of the propulsion driveline.

FIG. 1 shows a self-propelled windrower 10 incorporating the apparatus and method of the invention; however, it will be appreciated that the principles of the present invention are not limited to a self-propelled windrower, or to any specific type of harvesting machine.

In the illustrated embodiment, the self-propelled windrower 10 comprises a tractor 12 and a header 14, the header 14 being attached to the front end of the frame 16 or chassis of the tractor 12. The header may be of generally any suitable construction and design, and may include not only crop-harvesting mechanisms, but also crop conditioners such as elongate rolls 15. Such attachment of the header 14 to the frame 16 is achieved through a pair of lower arms 18 (only the left one being shown, the right being generally the same) pivoted at one end to the frame 16 and at the other end to the header 14, as well as through a central upper link 20.

One or more cylinders, such as individual lift and flotation cylinders, or a single lift/flotation cylinder, interconnects the lower arm 18 and the frame 16 on each side of the header.

Typical features and operation of a system for controlling the lift and flotation functions for a header, such as header 14 depicted herein, are disclosed in U.S. Pat. No. 6,901,729, incorporated herein by reference.

Referring also to FIGS. 2, 3, 4 and 5, windrower 10 includes a propulsion driveline 22 controllably operable using operator controls for rotatably driving a left wheel 24 and a right wheel 26 for propelling windrower 10 over a ground or other surface. Hydraulic motors (not shown) in connection with each wheel 24 and 26, respectively, are provided with fluid under pressure by hydraulic pumps 28, for driving the wheels. The pumps 28 can be differentially controlled for supplying different and varying amounts of pressurized fluid to the hydraulic motors, for effecting desired movements of windrower 10, including steering movements, as effected by operation of a rotatable and longitudinally movable propulsion rod 30 in connection with pintel arms 32 and 34 movable for controlling displacement of pumps 28 in the well-known manner. Steering commands are inputted to driveline 22 by an operator via an operator control which is a steering wheel 36 disposed in an operator cab 38 of windrower 10. Steering movements of windrower 10 are effected by rotating respective wheels 24 and 26 at different speeds. Propulsion speed and direction commands are inputted to driveline 22 by an operator via an operator control which is a FNR lever 40 also disposed in cab 38.

FNR lever 40 is configured to operate a suitable sensor or sensors operable for generating varying information or outputs representative of the position of lever 40 when lever 40 is manipulated or moved, including a rotary potentiometers 42 and a neutral switch 44, each of which is connected to a tractor control module 46 via a suitable conductive path or paths 48, which can be, for instance, a wire or wires of a wiring harness, an optical path, a wireless path, or the like. Movements of FNR lever 40 in relation to the neutral position will cause potentiometer 42 to output a varying signal representative of the position of lever 40, the signal comprising voltages. It is desired for these voltage signals to very precisely indicate the position of lever 40, such that precise control of the forward and rearward movements of windrower 10 can be achieved.

Neutral switch 44 is also mounted and configured such that movements of FNR lever 40 into the neutral position, and out of the neutral position, will cause changes in the operating state of switch 44. Here, forward and rearward movements of FNR lever 40 from a generally straight up neutral position shown, with a park brake switch in a state to disengage the park brake, will effect a change of state of switch 44 which will be outputted to control module 46, which will responsively power up the propulsion driveline, control module 46 controlling the propulsion speed of windrower 10 as a function of the voltage output potentiometer 42. Similarly, rearward movement of FNR lever 40 from the neutral position will effect a change of state of switch 44 outputted to control module 46 to affect operation of the propulsion driveline in the reverse direction if the park brake is in a disengaged state, and the voltage output of potentiometer 42 will be used to control reverse speed. It is also desired that, when lever 40 is moved into the neutral position, the propulsion system be controlled to positively de-stroke or otherwise transition into a non-propelling state over time, such that abrupt stoppage does not occur.

Other operator controls include a park brake switch 50 also connected to tractor control module 46 via a conductive path 48, and via another conductive path 48 to a key switch 52 and a start relay 54 in connection with a starter of engine 22 and with tractor control module 46. A 2-speed switch 56 is connected to tractor control module 46 via another conductive path 48.

Tractor control module 46 is in connection with a rotary potentiometer 62 via a conductive path 48, potentiometer 62 being operable for outputting information representative of the position of a propulsion cylinder 64. Propulsion cylinder 64 is extendable and retractable by solenoids controlled by tractor control module 46, based on the voltage output of potentiometers 42, to move propulsion rod 30 longitudinally for changing the stroke of the hydraulic pumps 28 via the angle of the pintel arms 32 and 34, for effecting propulsion of the windrower. A rotary potentiometer 66 is operable for outputting information representative of the position of pintel arm 34 to module 46 via another conductive path 48, providing information representative of differential stroking of pumps 28 to effect steering movements. Information representative of speed of respective wheels 24 and 26 is determined by reluctance speed sensors and communicated via conductive paths 48 to module 46. Differences in the speed readings is also indicative of steering movements.

Other illustrated elements of propulsion driveline 22 include a park brake latch relay 70; a propulsion enable relay 72; a propulsion interlock relay 74; a brake valve solenoid 76; a ground speed high solenoid 78; propulsion cylinder position sensor 82 incorporating dual rotary potentiometer 62 (FIG. 2); a pintel arm position sensor 84 incorporating rotary potentiometer 66 (also FIG. 2); left and right ground speed sensors 86 and 88; a propulsion forward solenoid 90; and a propulsion reverse solenoid 92.

As noted above, the instant invention utilizes control module 46 to monitor the propulsion commands inputted thereto by potentiometer 42 indicative of the position of FNR lever 40. Essentially, the output of potentiometer 42 is required for signaling propulsion commands or inputs. The output of dual potentiometer 62 is indicative of the position of propulsion cylinder 64 of the propulsion driveline 22, but two are used (dual Hall tracking) and the voltage outputs are continually summed. If the sum does not equal a predetermined value, here 5 V, it is determined that an error in the voltage signal of one or both of the potentiometers is present. The position of propulsion cylinder 64 (and thus the output of potentiometers 62) should, if normally operating, correspond to or track the inputted command from potentiometer 42, with consideration of normal deviations such as due to hysteresis, time lag in executing the propulsion commands, and the like dv/dt (changing voltage over time) thresholding of the FNR potentiometer is used to identify/evaluate any faults.

Reference input commands r (e.g., voltage inputted through the position of FNR lever 40 by potentiometer 42) are matched with responsive system/hardware outputs y (e.g., voltages outputted by potentiometers 62) to derive tracking errors e by control module 46 (Controller H). Tracking errors e are processed to determine any faults (Fault Detection F). This is preferably done using the following exponentially decaying integrator, also used for integration of current errors:

propulsion cylinder integrator=$\int e^{a(T-t)}*$(position error)$dT$, with limits of integration 0 to t.

electrical current integrator=$\int e^{a(T-t)}*$(current error)$dT$, with limits of integration 0 to t.

The integrals are approximated (using integer math) via the following formula in discrete time: integral(k)=error(k)+ [A*integral(k−1)] where, k is the sample time, and 0<A<1=decay rate.

to give the algorithm a forgetting type property wherein the most recent error signals are weighted more heavily than ones further in the past. A predetermined threshold is set on this exponentially decaying integrator to indicate when the controlled system is no longer tracking sufficiently well. When the value of the exponentially decaying integrator exceeds the threshold, appropriate action is taken to preserve the integrity and safety of the system, which can include outputting of a fault signal to the operator, an automatic system shutdown, or the like.

Another algorithm for monitoring the controller stability checks bounds. When the system is overshooting (measured system output exceeds the desired output value) or undershooting (measured system output is less than the desired output value) it is checked to make sure that the measured output value isn't at a corresponding saturation limit of the hardware, which would be an indication that the controller has become unstable.

If there is a fault, solenoids A and B (FIG. 2) controlling the valve which directs hydraulic fluid to the chambers of propulsion cylinder 64 are de-energized, to allow the spring associated with propulsion cylinder 64 to take propulsion rod 30 to neutral, and the park brake is allowed to be applied.

Referring also to FIGS. 7-20, lines of code of an actual computer program embodying the steps of the method of the invention for providing neutral safeing is disclosed. The notes accompanying the lines of code describe many features of the method of the invention. In the code, the FNR lever is identified as the MFH.

As one mode of neutral safeing, if the signal values outputted by potentiometer 42 or potentiometers 62, are outside of a predetermined range, control module 46 is automatically operable for engaging the park brake. This can involve, for instance de-energizing park brake latch relay 70.

As another neutral safeing function, control module 46 can be programmed such that when the park brake is engaged and an engine of the windrower is operating, the control module allows the operator to manually disengage the park brake (de-energizes or unlatches relay 70) when FNR lever 40 is in the neutral position and steering wheel 36 is set within a predetermined range from a straight ahead position, which range can be, for instance, but is not limited to, 80° in either direction from a straight ahead position.

As another neutral safeing function, control module 46 can be programmed to engage the park brake if start switch 52 is switched to its off position.

As still another safeing function, control module 46 can be programmed to engage the park brake if FNR lever 40 is in the neutral position and a seat switch indicates that an operator has not been seated on an operator seat of the windrower for a predetermined time.

In another safeing mode, control module 46/60 is programmed to automatically engage the park brake if potentiometer 42 is outputting signals representative of FNR lever 40 being in a position other than the neutral position and neutral switch 44 is in an operating state representative of FNR lever 40 being in the neutral position; and if the potentiometer signals are representative of FNR lever 40 being in the neutral position and neutral switch 44 is in an operating state representative of FNR lever 40 being in other than the neutral position.

Also, if a comparison of the signals outputted by potentiometers 42 and 62 indicate that propulsion cylinder 64 is stuck, control module 46/60 can automatically engage the park brake.

Controller 46/60 can also be programmed to only allow operation of key switch 52 for initiating operation of propulsion driveline 22 when park brake switch 50 is in a state for disengaging the park brake.

Still further, as another neutral safety mode, control module 46/60 can be programmed such that when the comparison of the rate of change of the FNR lever position and the rate of change of the propulsion cylinder position are different, the park brake can automatically be engaged.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

What is claimed is:

1. Apparatus for providing neutral safeing for a propulsion driveline of an agricultural windrower, comprising:
    a FNR lever assembly including a FNR lever having a neutral position and movable in relation to the neutral position in a first direction and in a second direction opposite the first direction, and at least one sensor disposed and operable for sensing positions of the FNR lever as the lever is moved in the first and second directions and outputting signals representative thereof, the at least one sensor being configured such that the signals outputted thereby are to have signal values within a predetermined range of values; and
    a programmable control module in connection with the at least one sensor for receiving the signals therefrom, the control module being connected in operative control of power to the propulsion driveline, of the windrower, and the control module being programmed and operable for monitoring the signals and comparing the values of the signals to the predetermined range, and if the value of any of the signals is outside of the predetermined range then disallowing the supply of power to the propulsion driveline.

2. The apparatus of claim 1, wherein the signals outputted by the at least one sensor comprise voltage signals, and the predetermined range comprises a voltage range.

3. The apparatus of claim 1, wherein the at least one sensor comprises a potentiometer.

4. The apparatus of claim 1, comprising a relay energizable for providing power to the propulsion driveline, the control module being connected in operative control of the relay, and the control module being operable for engaging the park brake by de-energizing the relay.

5. Apparatus of claim 1, wherein the control module is programmed such that when the park brake is engaged and an engine of the windrower is operating, the control module is operable for disengaging the park brake when the FNR lever is in the neutral position and a steering mechanism of the windrower is set within a predetermined range from a straight ahead position.

6. Apparatus of claim 1, wherein the control module is programmed to engage the park brake if a start switch in connection with the control module is in an off position.

7. Apparatus of claim 1, wherein the control module is programmed to engage the park brake if the FNR lever is in the neutral position and a seat switch indicates that an operator has not been seated on an operator seat of the windrower for a predetermined time.

8. Apparatus of claim 1, wherein the FNR lever assembly includes a neutral switch in connection with the control module, the neutral switch having a first operating state when the FNR lever is in the neutral position and a second operating state when the FNR lever is out of the neutral position, and wherein the control module is programmed to not supply power to the propulsion driveline if the at least one sensor is outputting signals representative of the FNR lever being in a position other than the neutral position and the neutral switch is in the first operating state, and if the signals outputted by the at least one sensor are representative of the FNR lever being in the neutral position and the neutral switch is in the second operating state.

9. Apparatus of claim 1, wherein the propulsion driveline includes a propulsion cylinder movable through a predetermined range of positions for effecting operation of the propulsion driveline within a predetermined range of speeds, and a sensor configured and operable for sensing a position of a propulsion cylinder and outputting signals representative thereof to the control module, and the control module being programmed to compare the signals representative of the positions of the propulsion cylinder to the signals representative of the positions of the FNR lever, and not supply power to the propulsion driveline if the signals representative of the positions of the propulsion cylinder do not correspond to the signals representative of the positions of the FNR lever so as to indicate that the propulsion cylinder is sticking in a position.

10. Apparatus of claim 1, comprising a key switch and a park brake switch in connection with the control module, and wherein the control module is programmed to allow operation of the key switch for initiating operation of the propulsion driveline only when the park brake switch is in a state for disengaging the park brake.

11. Apparatus of claim 1, wherein the at least one sensor is configured such that the signals outputted thereby as the FNR lever is moved are to change at a rate within a predetermined range of rates of change; and
    wherein the programmable control module is programmed and operable for monitoring the signals and comparing the rates of change thereof to the predetermined range of rates of change, and if any of the rates of change of the signals is outside of the predetermined range, then automatically engaging the park brake.

12. Apparatus for providing neutral safeing for a propulsion driveline of an agricultural windrower, comprising:
    a FNR lever assembly including a FNR lever having a neutral position and movable in relation to the neutral position in a first direction and in a second direction opposite the first direction, and at least one sensor disposed and operable for sensing positions of the FNR lever as the lever is moved in the first and second directions and outputting signals representative thereof, the at least one sensor being configured such that the signals outputted thereby as the FNR lever is moved are to change within a predetermined range of rates of change; and
    a programmable control module in connection with the at least one sensor for receiving the signals therefrom, the control module being connected in operative control of power to the propulsion driveline, of the windrower, and the control module being programmed and operable for monitoring the signals and comparing the values of the signals to the predetermined range, and if the value of any of the signals is outside of the predetermined range, then disallowing the supply of power to the propulsion driveline.

13. The apparatus of claim 12, wherein the signals outputted by the at least one sensor comprise voltage signals, and the predetermined range of rates of change comprises a range of rates of voltage change.

14. The apparatus of claim 12, wherein the at least one sensor comprises a potentiometer.

15. The apparatus of claim 12, comprising a relay energizable for providing power to the propulsion driveline, the control module being connected in operative control of the relay, and the control module being operable for engaging the park brake by de-energizing the relay.

16. Apparatus of claim 12, wherein the control module is programmed such that when the park brake is engaged and an engine of the windrower is operating, the control module is operable for disengaging the park brake when the FNR lever is in the neutral position and a steering mechanism of the windrower is set within a predetermined range from a straight ahead position.

17. Apparatus of claim 12, wherein the control module is programmed to engage the park brake if a start switch in connection with the control module is in an off position.

18. Apparatus of claim 12, wherein the control module is programmed to engage the park brake if the FNR lever is in the neutral position and a seat switch indicates that an operator has not been seated on the seat for a predetermined time.

19. Apparatus of claim 12, wherein the FNR lever assembly includes a neutral switch in connection with the control module, the neutral switch having a first operating state when the FNR lever is in the neutral position and a second operating state when the FNR lever is out of the neutral position, and wherein the control module is programmed to not supply of power from the propulsion driveline if the at least one sensor is outputting signals representative of the FNR lever being in a position other than the neutral position and the neutral switch is in the first operating state, and if the signals outputted by the at least one sensor are representative of the FNR lever being in the neutral position and the neutral switch is in the second operating state.

20. Apparatus of claim 12, wherein the propulsion driveline includes a propulsion cylinder movable through a predetermined range of positions for effecting operation of the propulsion driveline within a predetermined range of speeds, and a sensor configured and operable for sensing a position of a propulsion cylinder and outputting signals representative thereof to the control module, and the control module being programmed to compare the signals representative of the positions of the propulsion cylinder to the signals representative of the positions of the FNR lever, and not supply power from the propulsion driveline if the signals representative of the positions of the propulsion cylinder do not correspond to the signals representative of the positions of the FNR lever so as to indicate that the propulsion cylinder is sticking in a position.

21. Apparatus of claim 12, comprising a key switch and a park brake switch in connection with the control module, and wherein the control module is programmed to allow operation of the key switch for initiating operation of the propulsion driveline only when the park brake switch is in a state for disengaging the park brake.

22. The apparatus of claim 12, wherein the at least one sensor is configured such that the signals outputted thereby are to have signal values within a predetermined range of values, and wherein the programmable control module is programmed and operable for monitoring the signals and comparing the values of the signals to the predetermined range, and if the value of any of the signals is outside of the predetermined range, then automatically engaging the park brake.

23. A method for providing neutral safeing for a propulsion driveline of an agricultural windrower, comprising steps of:
providing a FNR lever assembly including a FNR lever having a neutral position and movable in relation to the neutral position in a first direction and in a second direction opposite the first direction, and at least one sensor disposed and operable for sensing positions of the FNR lever as the lever is moved in the first and second directions and outputting signals representative thereof, the at least one sensor being configured such that the signals outputted thereby as the FNR lever is moved are to change within a predetermined range of rates of change; and
providing a programmable control module in connection with the at least one sensor for receiving the signals therefrom, the control module being connected in operative control of power to the propulsion driveline of the windrower;
wherein the control module will:
monitor the signals and compare the rates of change thereof to the predetermined range of rates of change, and;
if any of the rates of change of the signals is outside of the predetermined range, then preventing the application of power to the propulsion driveline.

24. The method of claim 23, comprising further steps of:
providing a relay energizable for providing power to the propulsion driveline, the control module being connected in operative control of the relay, and wherein the control module will automatically de-energize the relay for engaging the park brake.

25. The method of claim 23, wherein the control module is programmed such that when the park brake is engaged and an engine of the windrower is operating, the control module will automatically disengage the park brake when the FNR lever is in the neutral position and a steering mechanism of the windrower is set within a predetermined range from a straight ahead position.

26. The method of claim 23, wherein the control module will automatically engage the park brake if a start switch in connection with the control module is in an off position.

27. The method of claim 23, comprising a further step of:
engaging the park brake if the FNR lever is in the neutral position and a seat switch indicates that an operator has not been seated on an operator seat for a predetermined time.

28. The method of claim 23, comprising further steps of:
providing a neutral switch associated with the FNR lever and in connection with the control module, the neutral switch having a first operating state when the FNR lever is in the neutral position and a second operating state when the FNR lever is out of the neutral position; and
wherein the control module will prevent the supply of power to the propulsion driveline if the at least one sensor is outputting signals representative of the FNR lever being in a position other than the neutral position and the neutral switch is in the first operating state, and if the signals outputted by the at least one sensor are representative of the FNR lever being in the neutral position and the neutral switch is in the second operating state.

29. The method of claim 23, comprising further steps of:
providing a propulsion cylinder movable through a predetermined range of positions for effecting operation of the propulsion driveline within a predetermined range of speeds;
providing a sensor configured and operable for sensing a position of a propulsion cylinder and outputting signals representative thereof to the control module; and
wherein the control module will compare the signals representative of the positions of the propulsion cylinder to the signals representative of the positions of the FNR lever, and prevent the supply of power to the propulsion driveline if the signals representative of the positions of the propulsion cylinder do not correspond to the signals representative of the positions of the FNR lever so as to indicate that the propulsion cylinder is sticking in a position.

30. The method of claim 23, comprising further steps of:
providing a key switch and a park brake switch in connection with the control module; and
wherein the control module will allow operation of the key switch for initiating operation of the propulsion driveline only when the park brake switch is in a state for disengaging the park brake.

31. A method for providing neutral safeing for a propulsion driveline of an agricultural windrower, comprising steps of:
providing a FNR lever assembly including a FNR lever having a neutral position and movable in relation to the neutral position in a first direction and in a second direction opposite the first direction;
providing at least one sensor disposed and operable for sensing positions of the FNR lever as the lever is moved in the first and second directions and outputting signals representative thereof, the at least one sensor being configured such that the signals outputted thereby are to have signal values within a predetermined range of values; and
providing a programmable control module in connection with the at least one sensor for receiving the signals therefrom, the control module being connected in operative control of power to the propulsion driveline of the windrower; and the control module being programmed and operable for:
monitoring the signals and comparing the values of the signals to the predetermined range, and;
if the value of any of the signals is outside of the predetermined range, then not applying power to the propulsion driveline.

32. The method of claim 31, comprising further steps of:
providing a relay energizable for providing power to the propulsion driveline, the control module being connected in operative control of the relay, and wherein the control module will automatically de-energize the relay for engaging the park brake.

33. The method of claim 31, wherein the control module is programmed such that when the park brake is engaged and an engine of the windrower is operating, the control module will automatically disengage the park brake when the FNR lever is in the neutral position and a steering mechanism of the windrower is set within a predetermined range from a straight ahead position.

34. The method of claim 31, wherein the control module will automatically engage the park brake if a start switch in connection with the control module is in an off position.

35. The method of claim 31, comprising a further step of:
engaging the park brake if the FNR lever is in the neutral position and a seat switch indicates that an operator has not been seated on an operator seat for a predetermined time.

36. The method of claim 31, comprising further steps of:
providing a neutral switch associated with the FNR lever and in connection with the control module, the neutral switch having a first operating state when the FNR lever is in the neutral position and a second operating state when the FNR lever is out of the neutral position; and
wherein the control module will eliminate the supply of power to the propulsion driveline if the at least one sensor is outputting signals representative of the FNR lever being in a position other than the neutral position and the neutral switch is in the first operating state, and if the signals outputted by the at least one sensor are representative of the FNR lever being in the neutral position and the neutral switch is in the second operating state.

37. The method of claim 31, comprising further steps of:
providing a propulsion cylinder movable through a predetermined range of positions for effecting operation of the propulsion driveline within a predetermined range of speeds;
providing a sensor configured and operable for sensing a position of a propulsion cylinder and outputting signals representative thereof to the control module; and
wherein the control module will compare the signals representative of the positions of the propulsion cylinder to the signals representative of the positions of the FNR lever, and eliminate power to the propulsion drive if the signals representative of the positions of the propulsion cylinder do not correspond to the signals representative of the positions of the FNR lever so as to indicate that the propulsion cylinder is sticking in a position.

38. The method of claim 31, comprising further steps of:
providing a key switch and a park brake switch in connection with the control module; and
wherein the control module will allow operation of the key switch for initiating operation of the propulsion driveline only when the park brake switch is in a state for disengaging the park brake.

39. The apparatus of claim 1, further comprising the control module configured to de-energizing a valve directing fluid to the propulsion driveline and returning the propulsion driveline to a neutral position if the value of any of the signals is outside of the predetermined range.

* * * * *